(12) United States Patent
Horisaka et al.

(10) Patent No.: US 7,429,209 B2
(45) Date of Patent: Sep. 30, 2008

(54) METHOD OF POLISHING A GLASS SUBSTRATE FOR USE AS AN INFORMATION RECORDING MEDIUM

(75) Inventors: Tamaki Horisaka, Osaka (JP); Koichi Suzuki, Osaka (JP); Akihide Minami, Osaka (JP)

(73) Assignee: Hoya Corporation, Tokyo (JP)

( * ) Notice: Subject to any disclaimer, the term of this patent is extended or adjusted under 35 U.S.C. 154(b) by 305 days.

(21) Appl. No.: 10/530,647

(22) PCT Filed: Dec. 25, 2003

(86) PCT No.: PCT/JP03/16671

§ 371 (c)(1), (2), (4) Date: Apr. 6, 2005

(87) PCT Pub. No.: WO2004/058450

PCT Pub. Date: Jul. 15, 2004

(65) Prior Publication Data

US 2006/0002283 A1     Jan. 5, 2006

(30) Foreign Application Priority Data

Dec. 26, 2002     (JP) ............................. 2002-378735

(51) Int. Cl.
*B24B 1/00*     (2006.01)

(52) U.S. Cl. .......................... 451/37; 451/41; 451/54; 451/57; 451/59

(58) Field of Classification Search ..................... 65/37, 65/61; 451/36, 37, 41, 54, 57, 59
See application file for complete search history.

(56) References Cited

U.S. PATENT DOCUMENTS 3,284,274 A     11/1966     Hulslander et al.
5,725,417 A *    3/1998     Robinson ..................... 451/56

(Continued)

FOREIGN PATENT DOCUMENTS

JP     64-058475     3/1989

(Continued)

OTHER PUBLICATIONS

Japanese Office Action dated Jun. 10, 2008 for Japanese Patent Application 2004-562932.

*Primary Examiner*—Timothy V Eley
(74) *Attorney, Agent, or Firm*—Sheridan Ross P.C.

(57) ABSTRACT

An information recording medium glass substrate manufactured by polishing the surface of a raw material glass plate. The polishing is divided into two steps, a step for performing a first polishing process to roughly polish the surface of the raw material glass plate to be smooth and a step for performing a second polishing process to finely polish the surface of the roughly polished raw material glass plate to be smoother. The second polishing process, using a polishing pad made of foam, is divided into two stages, pre-polishing with a polishing agent including abrasive grains of cerium oxide and post-polishing with a polishing agent including abrasive grains of silicon oxide. A rinsing process is performed between the pre-polishing and the post-polishing to rinse the raw material glass plate after the pre-polishing with a washing liquid to wash away the abrasive grains collected in the polishing pad in pre-polishing during the rinsing process.

16 Claims, 3 Drawing Sheets

U.S. PATENT DOCUMENTS

| | | | |
|---|---|---|---|
| 5,868,953 A | 2/1999 | Maekawa et al. | |
| 6,045,437 A * | 4/2000 | Tandon et al. | 451/288 |
| 6,261,158 B1 | 7/2001 | Holland et al. | |
| 6,354,919 B2 * | 3/2002 | Chopra | 451/57 |
| 6,436,811 B1 | 8/2002 | Wake et al. | |
| 6,439,965 B1 * | 8/2002 | Ichino et al. | 451/36 |
| 6,503,857 B2 * | 1/2003 | Nakajima et al. | 501/10 |
| 6,705,927 B2 | 3/2004 | Horie et al. | |
| 6,736,705 B2 * | 5/2004 | Benning et al. | 451/41 |
| 6,743,529 B2 * | 6/2004 | Saito et al. | 428/846.9 |
| 6,846,583 B2 | 1/2005 | Inaba et al. | |
| 7,010,939 B2 * | 3/2006 | Yoshikawa et al. | 65/30.14 |
| 7,065,984 B2 | 6/2006 | Kezuka et al. | |
| 2002/0055017 A1 | 5/2002 | Fukushima et al. | |

FOREIGN PATENT DOCUMENTS

| | | |
|---|---|---|
| JP | 08-255774 | 10/1996 |
| JP | 09-174428 | 7/1997 |
| JP | 11-151651 | 6/1999 |
| JP | 11-154325 | 6/1999 |
| JP | 2000-117605 | 4/2000 |
| JP | 2000-207733 | 7/2000 |
| JP | 2000-218535 | 8/2000 |
| JP | 2001-189295 | 7/2001 |
| JP | 2001-332517 | 11/2001 |
| JP | 2002-163817 | 6/2002 |
| JP | 2002-307293 | 10/2002 |
| JP | 2002-352422 | 12/2002 |
| JP | 2002-367318 | 12/2002 |
| JP | 2002-541649 | 12/2002 |
| WO | WO 02/39433 | 5/2002 |
| WO | WO 02/76675 | 10/2002 |

* cited by examiner

METHOD OF POLISHING A GLASS SUBSTRATE FOR USE AS AN INFORMATION RECORDING MEDIUM

FIELD OF THE INVENTION

The present invention relates to a glass substrate for an information recording medium used in a magnetic disc, which is a magnetic recording medium for an information recording device such as a hard disc, a magneto-optical disc, and an optical disc or the like, and a method for manufacturing the same.

BACKGROUND OF THE INVENTION

Conventionally, a glass substrate for an information recording medium must have a surface that is as smooth as possible to enable recording of information with high density. Thus, the surface of the glass substrate is ground and polished in plural stages during manufacturing to suppress the formation of microscopic protuberances (refer to, for example, Japanese Laid-Open Patent Publication No. 11-154325). That is, the glass substrate is ground and polished in steps broadly divided into four steps, rough grinding, fine-grinding, first polishing, and second polishing. The type of polishing pads, and the grain diameter and type of polishing agent are appropriately selected in accordance with the required polishing accuracy.

A polishing agent supply device for selectively supplying polishing agents of different types and different grain diameters to the same polishing device has been proposed to change the type or grain diameter of the polishing agent at each polishing step (refer to, for example, Japanese Laid-Open Patent Publication No. 2000-218535). According to such a polishing agent supply device, a plurality of polishing devices do not need to be prepared for each polishing agent that is used. This solves problems, such as that related to installation space.

Recent glass substrates are required to be recordable with higher density. To fulfill this requirement, the smoothness of the glass substrate surface must be improved. In order to improve smoothness of the surface of the glass substrate, the polishing agent must have a finer grain diameter in each polishing step, and the grain diameter of the polishing agent must become finer in a stepped manner as polishing proceeds.

However, when polishing is performed while changing the polishing agent in one polishing device under the above conditions, a problem in which the surface of the glass substrate becomes scratched arises. This is because a polishing agent having a large grain diameter is impregnated in the polishing pad during a preceding polishing step, and the impregnated polishing agent falls out during a subsequent polishing step thereby mixing with the polishing agent having a fine grain diameter. Thus, usage of different types of polishing agents or polishing agents having different grain diameters is impossible in the conventional art, and a plurality of polishing devices must be prepared for each polishing agent when the grain diameter or type is different. Further, when carrying out polishing with a plurality of polishing devices, the task of transferring the glass substrate between each polishing device is troublesome and requires a long period of time.

The present invention focuses on the problems existing in the conventional art. It is an object of the present invention to provide a method for manufacturing a glass substrate for an information recording medium capable of using polishing agents of different grain diameters or different types in the same polishing device, while improving production efficiency. A further object is to provide a glass substrate for an information recording medium having high quality to enable recording at a high density.

SUMMARY OF THE INVENTION

To achieve the above object, one aspect of the present invention is a method for manufacturing a glass substrate for an information recording medium manufactured by polishing the surface of a raw material glass plate. In the method, the polishing is divided into two steps, a step for performing a first polishing process to roughly polish the surface of the raw material glass plate to be smooth and a step for performing a second polishing process to finely polish the surface of the roughly polished raw material glass plate to be smoother. The second polishing process, which uses a polishing pad made of foam, is divided into two stages, which are pre-polishing with a polishing agent including abrasive grains of cerium oxide and post-polishing with a polishing agent including abrasive grains of silicon oxide. A rinsing process is performed between the pre-polishing and the post-polishing to rinse the raw material glass plate after the pre-polishing with a washing liquid to wash away the abrasive grains collected in the polishing pad in pre-polishing during the rinsing process.

It is preferred that the abrasive grains of cerium oxide have a mean grain diameter ($D_{50}$) of 1.5 μm or less and be smaller than the nap formation hole for the polishing pad.

It is preferred that the abrasive grains of silicon oxide have a grain diameter that is smaller than the grain of the cerium oxide, a mean grain diameter ($D_{50}$) of less than or equal to 0.2 μm, and be smaller than the aperture diameter of the nap formation hole for the polishing pad.

It is preferred that the second polishing process have a total task time of 7 to 45 minutes. It is preferred that the post-polishing have a task time of 1 to 40 minutes.

It is preferred that the rinsing process have a task of 1 to 20 minutes. It is preferred that in the rinsing process, load applied to the raw material glass plate by the polishing pad be lower than that in the pre-polishing. It is preferred that in the rinsing process, load applied to the raw material glass plate by the polishing pad be the same as or lower than that in the post-polishing. It is preferred that load related to the rinsing process be 25 to 70 g/cm².

It is preferred that in the glass substrate for an information recording medium obtained from the above manufacturing method, micro waviness height (NRa) of a surface measured by a three-dimensional surface structure analyzing microscope, with a measuring wavelength ($\lambda$) set at 0.2 to 1.4 mm, be 0.15 nm or less.

Another aspect of the present invention provides a polishing device for manufacturing a glass substrate for an information recording medium by polishing a surface of a raw material glass plate. The polishing device includes a polishing pad made of foam. The polishing pad performs raw material glass plate polishing that is divided into two stages, which are pre-polishing with a polishing agent including abrasive grains of cerium oxide and post-polishing with a polishing agent including abrasive grains of silicon oxide. A rinsing process is performed between the pre-polishing and the post-polishing for rinsing the raw material glass plate after the pre-polishing with a washing liquid. The polishing pad includes a nap layer with an inner layer, having a plurality of independent bubbles, and an outer layer formed in its surface, having a plurality of nap formation holes with an extremely fine size compared to the independent bubbles. The nap formation holes open at the surface of the polishing pad so that the abrasive grains collected in the polishing pad in the pre-polishing are washed away during the rinsing process.

It is preferred that the nap formation holes of the polishing pad have a hole diameter of 2 μm or greater and 20 μm or less, and a depth of 2 μm or greater and 100 μm or less.

The polishing device further includes a lower polishing plate and an upper polishing plate arranged rotatably about a rotation shaft, and a carrier, arranged between the upper polishing plate and the lower polishing plate, for supporting a plurality of raw material glass plates. The surface of the raw material glass plate is polished by the polishing pad by rotating the upper polishing plate and the lower polishing plate in a state in which the polishing pad is attached to the lower polishing plate and the upper polishing plate as necessary.

DETAILED DESCRIPTION OF THE PREFERRED EMBODIMENTS

An embodiment of the present invention will now be described with reference to the drawings.

During manufacturing of a glass substrate for an information recording medium, a raw material glass plate is cut out in a disc-shape from a sheet of glass plate. The center of the raw material glass plate includes a circular hole. The glass substrate is formed by polishing the surface of the raw material glass plate with a polishing device. The glass substrate is formed from a multicomponent glass material, such as soda lime glass, aluminosilicate glass, borosilicate glass, and crystallized glass that are manufactured using a float method, a downdraw method, a redraw method, or a press method. A magnetic film and a protective film made of metals or alloys of cobalt (Co), chromium (Cr), iron (Fe) and the like are formed on the surface of the glass substrate obtained from the raw material glass plate to configure an information recording medium such as a magnetic disc, a magneto-optical disc, and an optical disc.

Figure 1:
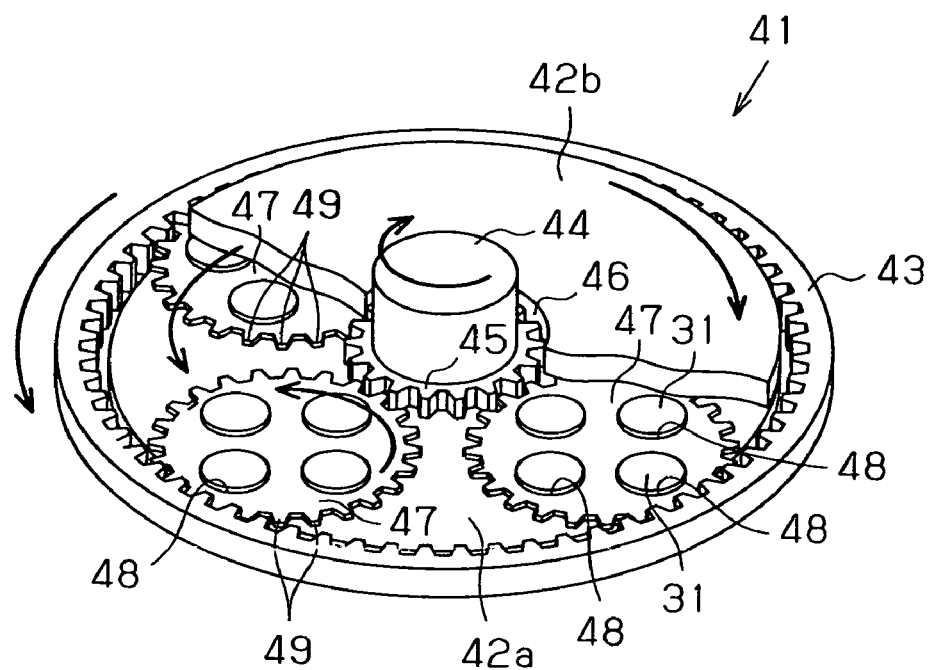
FIG. 1 is a cutaway perspective view showing part of a batch-type polishing device.

As shown in FIG. 1, a polishing device 41 includes a disc-shaped upper polishing plate 42b and lower polishing plate 42a that are parallel to each other and spaced from each other in the vertical direction. An annular internal gear 43 encircles the upper polishing plate 42b and the lower polishing plate 42a. A rotation shaft 44 projects from the center of the lower polishing plate 42a, and a sun gear 45 is arranged on the peripheral surface at the lower end of the rotation shaft 44. An insertion hole 46 is formed at the center of the upper polishing plate 42b, and the rotation shaft 44 is inserted through the insertion hole 46. The upper polishing plate 42b, the lower polishing plate 42a, the internal gear 43 and the sun gear 45 are driven by a motor or the like so as to be independently rotated. A plurality of carriers 47 is arranged between the lower polishing plate 42a and the upper polishing plate 42b. A plurality of circular holes 48 is formed in the carriers 47. Each circular hole 48 receives a raw material glass plate 31. Further, a gear 49 is formed on the peripheral portion of each carrier 47. The gears 49 are meshed with the internal gear 43 and the sun gear 45.

In the polishing device 41, a polishing pad, which is formed from synthetic resin foam, is attached to the surfaces of the lower polishing plate 42a and the upper polishing plate 42b when necessary. The raw material glass plate 31 is held between the lower polishing plate 42a and the upper polishing plate 42b or between a pair of polishing pads in a state received in a circular hole 48 of the carrier 47. In this state, polishing agent is supplied from a supply section (not shown) to the surface of the raw material glass plate 31 by way of the lower polishing plate 42a, the upper polishing plate 42b, and the polishing pad. A plurality of supply holes (not shown) extend in the thickness-wise direction on the lower polishing plate 42a, the upper polishing plate 42b, and the polishing pads. The polishing agent is supplied to the supply holes from a supply section, such as a tank containing the polishing agent. By rotating the upper polishing plate 42b, the lower polishing plate 42a, the internal gear 43, and the sun gear 45, each carrier 47 revolves about the rotation shaft 44 while rotating about its axis with the raw material glass plate 31 contacting the lower polishing plate 42a and the upper polishing plate 42b or the polishing pads. This polishes the surface of the raw material glass plate 31.

The method of manufacturing the glass substrate will now be described.

The glass substrate is manufactured through a disc processing step, a beveling step, a lapping step, a polishing step, and a washing step.

In the disc processing step, a sheet of glass plate is cut using a cutter made of cemented carbide or diamond to form a disc-shaped raw material glass plate having a circular central hole. In the beveling step, inner and outer circumferential surfaces of the raw material glass plate are ground so that the outer diameter and the inner diameter have predetermined dimensions and so that the edges of the inner and outer circumferential surfaces are polished and beveled.

In the lapping step, a lapping process is performed on the raw material glass plate to correct the warp of the entire raw material glass plate. Thus, the raw material glass plate becomes a substantially flat plate. The lapping process, which uses the polishing device 41, is performed by sliding the surface of the raw material glass plate 31 along the lower polishing plate 42a and the upper polishing plate 42b while supplying the polishing agent to grind the surface. Further, for the polishing agent of the lapping process, a slurry of abrasive grains, which are grains of alumina and the like, dispersed in water, which serves as a dispersion medium, is used.

The polishing step, which uses the polishing device 41, is performed in a state in which the polishing pads are attached to the lower polishing plate 42a and the upper polishing plate 42b by sliding the polishing pads along the surface of the raw material glass plate 31. In the polishing step, the sliding of the polishing pads polishes and smoothes the surface of the raw material glass plate. In the washing step, foreign materials, such as polishing agent, polishing powder, and dust on the surface of the raw material glass plate subsequent to polishing are washed away with a washing liquid. This manufactures a glass substrate having a smooth surface and high cleanliness.

The manufactured glass substrate has a surface roughness Ra of preferably 0.4 nm or less. Further, the waviness height Wa of the surface is preferably 0.5 nm or less. Moreover, the micro waviness height NRa of the surface is preferably 0.15 nm or less. The surface roughness Ra indicates a value measured with an atomic force microscope (AFM). The waviness height Wa of the surface is a value measured with a multi-functional disc interferometer (Optiflat) manufactured by Phase Metrix Corporation by scanning a predetermined region of the surface with white light having a measuring wavelength ($\lambda$) between 0.4 to 5.0 mm. The micro waviness height NRa of the surface is a value measured with a three-dimensional surface structure analyzing microscope (New View 200) manufactured by Zygo Corporation by scanning a predetermined region of the surface using white light having a measuring wavelength ($\lambda$) between 0.2 to 1.4 mm.

When the surface roughness Ra, the waviness height Wa and the micro waviness height NRa respectively exceed 0.4 nm, 0.5 nm, and 0.15 nm, the surface of the glass substrate roughens. Thus, the glass substrate may have lower smoothness and lower quality. When the glass substrate has low quality, the distance between the surface of the information recording medium and the head for reading the information recorded on the information recording medium cannot be shortened. Thus, high-density recording becomes difficult. This is because when the head moves on the information recording medium, deficiencies such as the head hitting or being caught in the wavinesss of the surface tend to occur.

In the conventional method for manufacturing the glass substrate, the polishing step is divided mainly into three steps, which include a step for performing a first polishing process, a step for performing a second polishing process, and a step for performing a third polishing step so that the surface roughness Ra, the waviness height Wa, and the micro waviness height NRa of the glass substrate has the above values. In the conventional first polishing process, the surface of the raw material glass plate is roughly polished to improve the waviness height Wa. In the conventional second polishing process, the surface of the raw material glass plate is finely polished to improve the micro waviness height NRa and the surface roughness Ra. In the conventional third polishing process, the surface of the raw material glass plate is ultra-finely polished to further improve the micro waviness height NRa and the surface roughness Ra.

The purpose of each process is to polish the raw material glass plate and thus the same. Therefore, polishing devices having the same structure are used. However, since the improvement subject differs, polishing pads having different hardness is used in the first polishing process and the second polishing process, and polishing agents of different types and different grain diameters are used in the second polishing process and the third polishing process.

In comparison, the polishing step of the present invention is divided into two steps, which include a step for performing a first polishing process to roughly polish and smooth the surface of the raw material glass plate and a step for performing a second polishing process to finely polish and further smooth the surface of the roughly polished raw material glass plate. That is, one feature of the present invention is in that the polishing step is completed by two steps, which are the step for performing the first polishing process and the step for performing the second polishing process. When completing the polishing step in two steps, if the conventional third polishing process is simply omitted, the micro waviness height NRa and the surface roughness Ra of the manufactured glass substrate will not achieve the above values. This will lower the quality. Further, when the conventional second polishing process is simply omitted, the time for ultra-fine polishing associated with the conventional third polishing process becomes longer. This is because the polishing amount per unit time is small during ultra-fine polishing since a polishing agent having a finer grain size than for fine polishing is used.

It is an object of the present invention to manufacture a glass substrate that satisfies the values of the surface roughness Ra, the waviness height Wa, and the micro waviness height NRa while completing the polishing step in two steps. The first polishing process and the second polishing process of the present invention will now be described.

The first polishing process is a process of removing defects such as, small warps, wavinesss, chipping, and cracks in the surface of the raw material glass plate. That is, such defects are formed within a range of substantially a constant thickness (depth) from the surface of the raw material glass plate. Thus, by removing part of the surface through polishing so that the entire raw material glass plate has a thickness of a predetermined value, the defects are also removed. Among the defects, wavinesss are formed in lines on the surface of the glass plate when manufacturing the glass plate, which is the material of the raw material glass plate, through the above mentioned float method and the like and are potentially present in the raw material glass plate. Therefore, in the first polishing process, among the waviness height Wa, the micro waviness height NRa, and the surface roughness Ra, the surface roughness Wa is mainly improved.

In the first polishing process, the removal depth for rough polishing is considered to be important because parts of the surface including defects is removed from the raw material glass plate. Since the polishing step is performed to smooth the surface of the raw material glass plate, a state in which the surface of the raw material glass plate is rougher after the first polishing process than before the process would contradict the object of the polishing step. Therefore, in the first polishing process, to make the surface of the raw material glass plate smoother than prior to processing, it is important that the surface of the raw material glass plate not be damaged during rough polishing. In the first polishing process, a hard polisher having hardness capable of scraping off the surface of the raw material glass plate without scratching the surface of the raw material glass plate is used.

For such a hard polisher, a rough sponge-like foam made of a synthetic resin, such as polyurethane or polyester, having a surface including visible bubbles may be used. The JIS A hardness of the hard polisher defined under JIS K6301 is preferably between 65 and 95. Further, the compressive elasticity modulus is preferably between 60 to 95%. It is preferred that the hard polisher be attached to the lower polishing plate 42a and the upper polishing plate 42b so that the compressibility is between 1 and 4%.

If the JIS A hardness is less than 65, the compressive elasticity modulus is less than 60%, or the compressibility is higher than 4%, the hard polisher does not have the desired hardness, and a long period of time is required to reach a certain removal depth. In addition, as the hard polisher deforms during polishing and, particularly, as protuberances and wavinesss form on the surface of the polisher, defects such as wavinesss may be formed on the surface of the raw material glass plate and the surface of the glass plate may not be smoothed. If the JIS A hardness is greater than 95, the compressive elasticity modulus is higher than 80%, or the compressibility is less than 1%, the surface of the raw material glass plate may be damaged by the hard polisher, and the surface condition may roughen.

The second polishing process is a process for scraping off an extremely small part from the surface of the raw material glass plate to correct microscopic defects such as micro-wavinesss and microscopic protuberances present in the surface. Such microscopic defects are mostly formed by polishing traces, such as those made during the lapping process or the first polishing process, and distortions resulting from stress during polishing and the like. The protuberances are evened out and corrected to be smooth by scraping the high portions of micro wavinesss or the ridges of microscopic protuberances. When entirely scraping microscopic defects, such as wavinesss, polishing traces formed on the surface of the raw material glass plate when scraping off the microscopic defects may become new defects and increase the microscopic defects. In the second polishing process, among the waviness height Wa, the micro waviness height NRa and the surface roughness Ra, the micro waviness height NRa and the surface roughness Ra are improved.

In the second polishing process, the removal depth of fine polishing is not important since the surface of the raw material glass plate is polished and evened so as to become a smooth mirror-finished surface, and scraping off only the upper part of the microscopic defect without damaging the surface of the raw material glass plate is considered important. Thus, in the second polishing process, a soft polisher having softness enabling of polishing without greatly scraping the surface of the raw material glass plate is used as the polishing pad.

For such a soft polisher, a fine suede-like foam made of a synthetic resin, such as polyurethane or polyester, having a surface with fine bubbles that are hardly visible is used. The Asker C hardness of the soft polisher defined under Society of Rubber Industry, Japan Standard SRIS-0101, is preferably between 58 and 85. The compressive elasticity modulus is preferably between 58 and 90%. It is preferred that the hard polisher be attached to the lower polishing plate 42a and the upper polishing plate 42b so that the compressibility is between 1 and 5%.

If the Asker C hardness is less than 58, the compressive elasticity modulus is less than 58%, or the compressibility is higher than 5%, the soft polisher may deform during polishing and, particularly, as protuberances and wavinesss form on the surface of the polisher, defects such as micro wavinesss may be formed on the surface of the manufactured glass plate. Further, if the Asker C hardness is greater than 85, the compressive elasticity modulus is higher than 90%, or the compressibility is less than 1%, the surface of the raw material glass plate may be damaged by the soft polisher, and the manufactured glass substrate may have a rougher surface. The suede-like soft polisher essentially differs greatly from the sponge-like hard polisher in hardness and is difficult to compare with the same criteria. Thus, the hard polisher is represented by JIS A hardness and the soft polisher is represented by Asker C hardness.

In the second polishing process, the raw material glass plate is fine polished in two stages of pre-polishing and post-polishing. This is to polish the raw material glass plate to substantially the same degree as the conventional third polishing process in the second polishing process.

In the stage of the first half for fine polishing, that is, in pre-polishing, a slurry, in which grains of cerium oxide serving as abrasive grains are dispersed in water serving as a dispersion medium, is used as the polishing agent. The reason cerium oxide is selected as the abrasive grains of the polishing agent is in that cerium oxide chemically acts with the glass material and polishes the surface more effectively and efficiently. Further, it is preferred that abrasive grains having a mean grain diameter ($D_{50}$) of 1.5 μm or less be used as the abrasive grain. The mean grain diameter of the abrasive grain is more preferably between 0.2 and 1.5 μm. If the mean grain diameter of the abrasive grains is too large, scratches such as polishing traces may form on the surface of the raw material glass plate during pre-polishing. If the mean grain diameter of the abrasive grains is too small, the polishing amount per unit time is reduced, and the polishing time associated with pre-polishing may be prolonged. Further, in the pre-polishing, the micro waviness height NRa and the surface roughness Ra are improved until about half the value of the first polishing is achieved.

In the last half of the stage of fine polishing, that is, in post-polishing, that in which the abrasive grains having a grain diameter smaller than that used in the pre-polishing are dispersed in water serving as the dispersion medium and made into slurry is used. The grains of silicon oxide such as colloidal silica are used for the abrasive grains. Further, the mean grain diameter ($D_{50}$) of the abrasive grain is preferably less than or equal to 0.2 μm. If $D_{50}$ exceeds 0.2 μm, the raw material glass plate becomes damaged in post-polishing, and the desired smoothness is not obtained. In the relevant post-polishing, the micro waviness height NRa and the surface roughness Ra are improved until about half the value of the pre-polishing is achieved.

In the second polishing process, a rinsing process is included between the pre-polishing and the post-polishing. The rinsing process is a process for rinsing the raw material glass plate with a washing liquid after polishing. During pre-polishing, abrasive grains of the polishing agent, fragments of the abrasive grains, and glass powder are attached to the surface of the raw material glass plate. If such foreign materials remain on the surface, the foreign materials would damage the raw material glass plate during post-polishing. Thus, there is a need to include the rinsing process to rinse and wash the surface of the raw material glass plate with the washing liquid. The rinsing process is performed by supplying the washing liquid to the polishing device while sliding the raw material glass plate on the soft polisher, and the foreign materials are removed from the surface of the raw material glass plate by the sliding of the soft polisher. Further, for the washing liquid, water, pure water, alcohol such as isopropyl alcohol, electrolytic water obtained through electrolytic processing of aqueous solution of inorganic salt such as alkaline metal salt of sodium chloride and the like, or functional water such as water dissolved with gas is used.

In the second polishing process, the pre-polishing, the post-polishing, and the rinsing process are continuously performed, unlike when there are two steps, a first polishing process and a second polishing process, that are intermittently performed. That is, the first polishing and the second polishing process are each assigned with a polishing device since they use different types of polishing pads, and the task of transferring the raw material glass plate between the polishing devices between polishing processes is required. Conversely, the pre-polishing, the post-polishing and the rinsing process are continuously performed in the same polishing device since the same type of polishing pad is used. Thus, the polishing agent used in the pre-polishing and the post-polishing, and the washing liquid used in the rinsing process are selectively supplied from the supply section to the supply holes of the polishing device. At least three types of pipes are connected to the supply hole of the polishing device to supply two types of polishing agents and washing liquid. The two types of polishing agent and the washing liquid are switched and supplied to the supply hole by opening and closing valves for the pipes.

When switching the two types of polishing agents and the washing liquid, the polishing agent impregnated in the polishing pad during pre-polishing may fall out of the polishing pad during post-polishing and the two types of polishing agents may mix. To prevent this, the soft polisher, which serves as the polishing pad, that is used resists impregnation of polishing agents.

Figure 2:
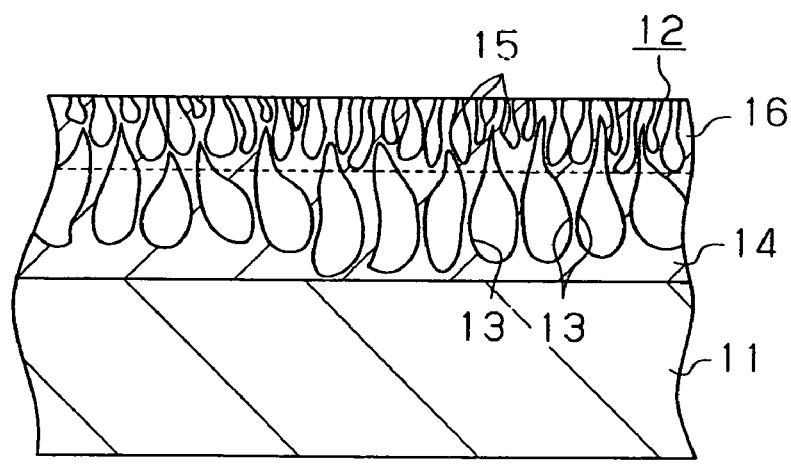
FIG. 2 is a schematic view of a cross-section of a polishing pad.

As schematically shown in FIG. 2, the soft polisher includes a base material 11, which is made of a non-woven cloth or the like, and a nap layer 12, which is superimposed on the surface of the base material 11. The nap layer 12 has a two-layer structure including an inner layer 14, with a plurality of independent air bubbles, and an outer layer 16, with a plurality of nap formation holes 15 opened at the surface of the nap layer 12. Each independent air bubble 13 is shaped like a water droplet, in which it expands toward the inner side of the nap layer 12 and narrows toward the surface of the nap layer 12, and is formed to extend in the thickness-wise direction of the nap layer 12. Each nap formation hole 15 has an extremely fine size compared to the independent air bubbles 13, is shaped like a shallow vase, and is formed independently without communicating with the independent air bubbles 13.

During the second polishing process, the abrasive grains of the polishing agent enter the nap formation holes 15. The abrasive grains polish the surface of the raw material glass plate while entering and exiting the nap formation hole 15. In this state, the abrasive grains in the nap formation holes 15 remain in the nap formation holes 15 without going deep into the nap layer 12 since the nap formation holes 15 are not communicated with the independent air bubbles 13. The abrasive grains remaining in the nap formation holes 15 are easily washed out from the nap formation hole 15 with the washing liquid during the rinsing process and discharged outside. Therefore, the abrasive grains are prevented from traveling deep into the nap layer 12, and by washing away the abrasive grains in the nap formation holes 15 during the rinsing process, the polishing agent used in pre-polishing is prevented from falling out from the nap formation hole 15 during post-polishing.

A polishing pad, referred to as a so-called non-buff pad, that does not undergo buff polishing in advance is used as the soft polisher, which includes the nap layer 12 that has a two-layer structure. Buff polishing refers to polishing in which the surface of the polishing pad made of foam is roughly scraped with a grind stone or the like.

Normally, a polishing pad made of a foam does not include holes open in the surface in a state immediately after manufacturing. Buff polishing is performed and part of the surface layer is scraped to open the independent air bubbles and form the nap formation holes. That is, when the part of the outer layer 16 above the broken line in FIG. 2 is scraped off, the independent air bubbles 13 open at the surface of the nap layer 12, and become the nap formation holes. Therefore, in such a normal polishing pad, the nap formation holes have large diameters, which differ between holes, and are deep. More specifically, the diameters are between 20 and 100 μm, and the depth is between 400 and 700 μm.

Conversely, the soft polisher serving as the polishing pad of the second polishing process in the present embodiment is such in which the nap formation holes 15 are formed from microscopic air bubbles in the part that is normally scraped off. Thus, the nap formation holes 15 have a diameter of less than 20 μm and a depth of less than 100 μm. The diameter of the nap formation holes 15 is preferably greater than or equal to 2 μm but less than 20 μm. If the diameter is less than 2 μm, the abrasive grains of the polishing agent do not easily enter the nap formation holes 15. If, on the other hand, the hole diameter is greater than or equal to 20 μm, a large amount of abrasive grains that cannot be washed away during the rinsing process enters the nap formation hole 15. The depth of the nap formation hole 15 is greater than or equal to 2 μm but less than 100 μm. If the depth is less than 2 μm, the abrasive grains of the polishing agent are not easily accommodated in the nap formation holes 15. When the depth exceeds 100 μm, the abrasive grains enter too deeply into the nap formation holes 15 such that they cannot be washed away during the rinsing process.

The soft polisher does not have holes open at the surface in a state immediately after manufacturing. Thus, the surface of the soft polisher must be polished to open the nap formation holes 15 without performing buff polishing. A pad dressing process is performed on the soft polisher in advance after the soft polisher is installed in the polishing device but before it is used for polishing. The pad dressing process is a process for polishing only a slight amount of the surface of the polishing pad using a dresser. The dresser may be a pad dresser, formed by electrodepositing diamond abrasive grains on the surface of a base material having a circular-plate shape, or a pellet dresser, formed by embedding diamond pellets in the surface of a base material. Among these dressers, the pad dresser is preferably used in the pad dressing process. This is because the pad dresser has finer abrasive grains compared to the pellet dresser and over-polishing of the surface of the polishing pad can be suppressed.

As described above, the features of the second polishing process of the present invention is in that fine polishing is divided into the two stages of pre-polishing and post-polishing, the rinsing process is included between the pre-polishing and the post-polishing, the polishing agent is switched between the pre-polishing and the post-polishing, and the nap layer 12 having the two-layer structure.

With such features, the second polishing process can be performed using one type of polishing pad and one polishing device while changing the types and grain diameter of the polishing agents during the process. Thus, by changing the types and grain diameter of the polishing agents during the second polishing process while completing the polishing step in the two steps of the first polishing process and the second polishing process, the glass substrate is manufactured so as to satisfy the values of the above surface roughness Ra, the waviness height Wa, and the micro waviness height NRa. Further, in order to reliably satisfy the values of the above surface roughness Ra, the waviness height Wa, and the micro waviness height NRa, the manufacturing conditions relating to each of the pre-polishing, the rinsing process and the post-polishing are preferably set as described below.

In the pre-polishing, the load applied to the raw material glass plate by the soft polisher is preferably between 50 and 120 g/cm$^2$. If the load is less than 50 g/cm$^2$, the raw material glass plate is not sufficiently finely polished during pre-polishing. In this case, the values of the surface roughness Ra and the micro waviness height NRa of the manufactured glass substrate may become high, or the polishing time associated with the post-polishing must be prolonged to satisfy the values of the surface roughness Ra and the micro waviness height NRa of the glass substrate. If the load exceeds 120 g/cm$^2$, the surface of the soft polisher may deform, and microscopic defects, such as micro wavinesss, may form on the surface of the raw material glass plate. This may result in deficiencies such as the values of the surface roughness Ra and the micro waviness height NRa becoming high or the raw material glass plate being broken by the load during pre-polishing.

In the post-polishing, the load applied to the raw material glass plate by the soft polisher is preferably between 30 and 100 g/cm$^2$. If the load is less than 30 g/cm$^2$, the raw material glass plate is not sufficiently polished in the post-polishing, and the surface roughness Ra, or the micro waviness height NRa of the manufactured glass substrate may not satisfy the desired values. If the load exceeds 100 g/cm$^2$, the surface of the soft polisher may deform, and microscopic defects, such as micro wavinesss, may form on the surface of the raw material glass plate. This may result in deficiencies such as the values of the surface roughness Ra and the micro waviness height NRa becoming high or the raw material glass plate being broken by the load.

In the rinsing process, the load applied to the raw material glass plate by the soft polisher is preferably lower than the load of the pre-polishing. Further, the load is preferably the same or low compared to the load of the post-polishing. More specifically, the load is preferably between 25 and 70 g/cm$^2$. If the load is less than 25 g/cm$^2$, foreign materials are not sufficiently removed from the surface of the raw material glass plate or abrasive grains of the polishing agent remains in the nap formation holes 15. If the load exceeds 70 g/cm$^2$, this may result in deficiencies such as the raw material glass plate being broken by the load during the rinsing process.

Among the pre-polishing, the rinsing process, and the post-polishing, the task time for post-polishing is preferably between 1 and 40 minutes. If the task time for post-polishing is less than one minute, the surface of the raw material glass plate is not sufficiently polished. If the task time is longer than 40 minutes, the smoothness of the raw material glass-plate will not further improve, and the amount of production would be lowered due to the prolonged task time.

Further, the task time of the rinsing process is preferably between 1 and 20 minutes. If the task time of the rinsing process is less than one minute, the polishing agent used in the first polishing process is not sufficiently removed, and polishing traces form on the surface of the raw material glass plate at the second polishing process. Even if the task time is longer than 20 minutes, foreign materials and residual polishing agent cannot be further removed, and the amount of production would be lowered due to the prolonged task time.

The total task time of the second polishing process is preferably between 7 and 45 minutes. This is the task time made possible by continuously performing the pre-polishing, the rinsing process, and the post-polishing without the need for exchanging raw material glass plates. In order to have the total task time be less than 7 minutes, at least one of the pre-polishing, the rinsing process, and the post-polishing must have a shorter task time or be omitted. In this case, the surface of the raw material glass plate may not be sufficiently polished or the surface of the raw material glass plate may be damaged. If the total task time is longer than 45 minutes, the task time of at least one of the pre-polishing, the rinsing process, and the post-polishing is too long. If the task time of any one of the pre-polishing, the rinsing process, and the post-polishing is too long, the effect of improvement in smoothness and cleanliness of the surface cannot be expected. Moreover, the longer task time may lower the production efficiency.

The advantages of the above embodiment will now be described.

In the method for manufacturing the glass substrate of the embodiment, the second polishing process is carried out by dividing fine polishing into the two stages of pre-polishing and post-polishing. Further, the rinsing process is included between the pre-polishing and the post-polishing. Polishing agents of different type and different grain diameters are used for the pre-polishing and the post-polishing. Further, the soft polisher used in the second polishing process includes the nap layer 12 with a two-layer structure and is formed so that the polishing agent is not impregnated deeply in the soft polisher. In the second polishing process, therefore, polishing agents of different grain diameters or different types are used in the same polishing device. This enhances the production efficiency. In order to satisfy the values of the desired surface roughness Ra, the waviness height Wa, and the micro waviness height NRa, a polishing step that conventionally requires up to the third polishing step is completed at the second polishing process. This shortens the manufacturing time and increases the amount of production.

The grains of cerium oxide used in pre-polishing has a mean grain diameter ($D_{50}$) of 1.5 μm or less. In addition, the grains of silicon oxide used in post-polishing have a mean grain diameter ($D_{50}$) of 0.2 μm or less. Thus, the number of steps associated with the polishing step is reduced, the manufacturing time is shortened and the amount of production is increased while maintaining the quality of the manufactured glass substrate.

The total task time of the second polishing process is between 7 and 45 minutes. During this period, the task time of the post-polishing is between 1 and 40 minutes, and the task time of the rinsing process is between 1 and 20 minutes. Thus, the task time is shortened while maintaining satisfactory quality of the glass substrate.

In the rinsing process, the load applied to the raw material glass plate by the polishing pad is lower than that for the pre-polishing or the post-polishing. Thus, deficiencies such as scratching and cracking of the raw material glass plate are prevented while foreign materials are removed from the surface of the raw material glass plate in a satisfactory manner.

The surface of the glass substrate manufactured through the above manufacturing method has a micro waviness height NRa of 0.15 nm or less. Thus, the glass substrate has high quality and enables high density recording.

Examples embodying the above embodiment will now be explained.

Observation of Polishing Pad

Figure 3:
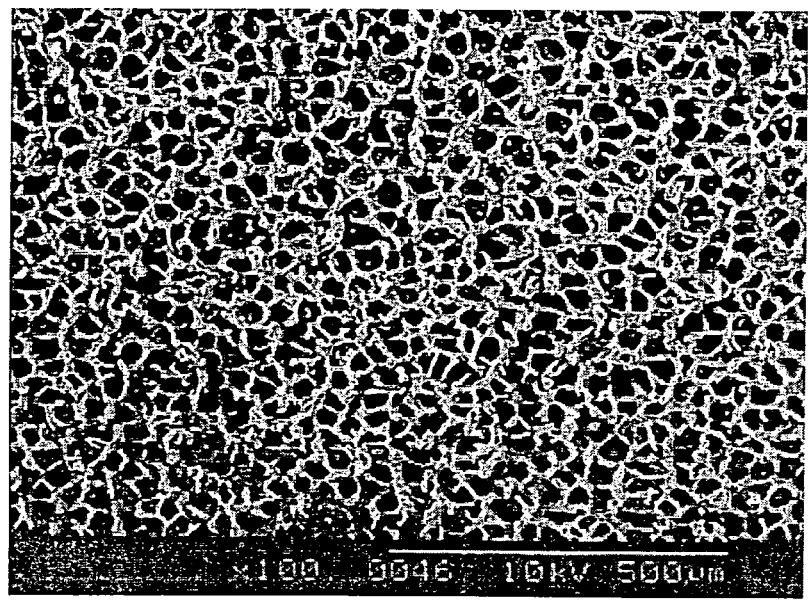
FIG. 3 is a view showing the state of the surface of a raw material glass plate in one example taken with an electron microscope.
Figure 4:
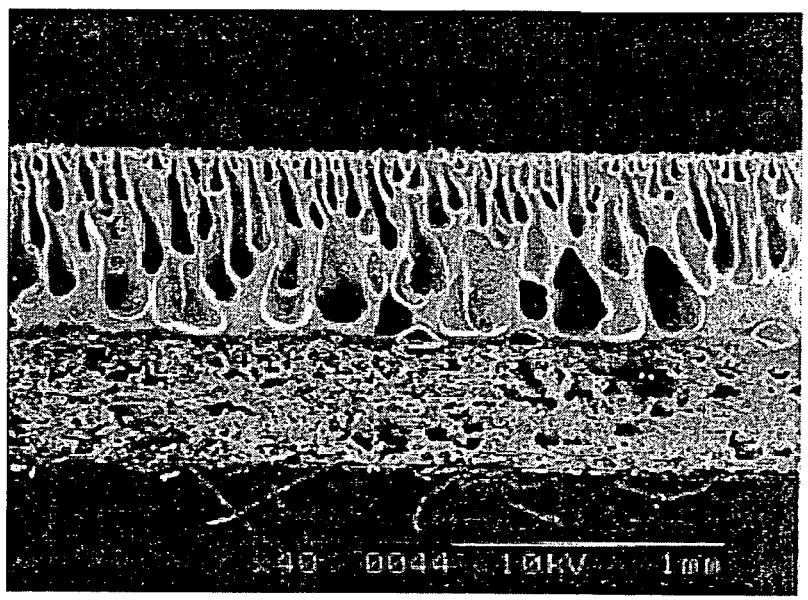
FIG. 4 is a view showing the state of the cross-section of the raw material glass plate of FIG. 3 taken with the electron microscope.
Figure 5:
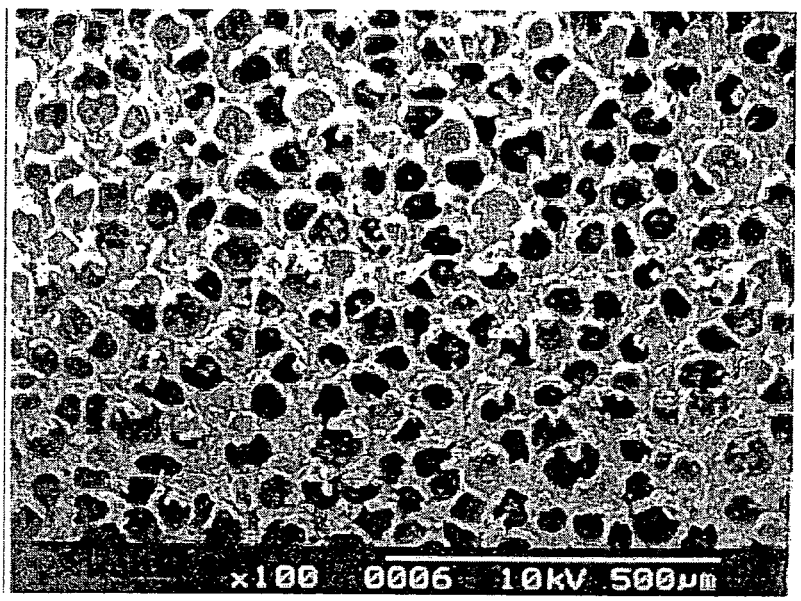
FIG. 5 is a view showing the state of the surface of the raw material glass plate in a comparative example taken with the electron microscope.
Figure 6:
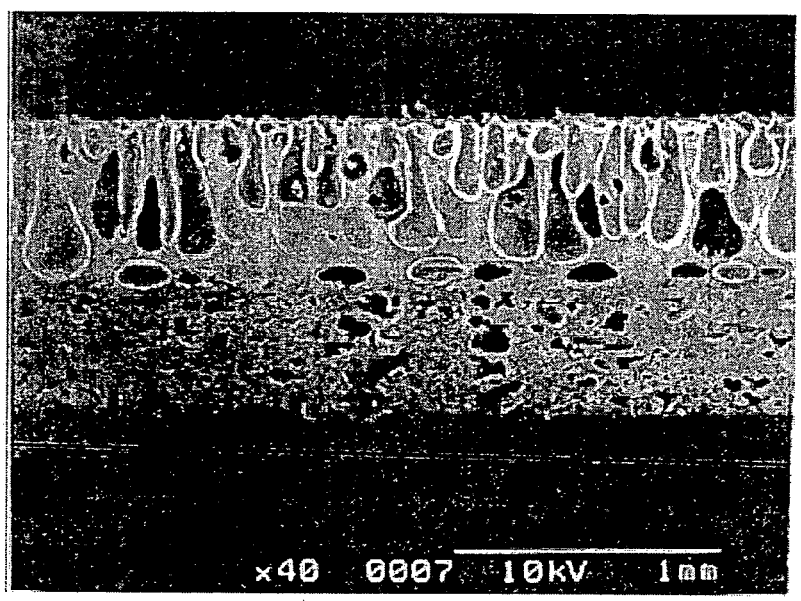
FIG. 6 is a view showing the state of the cross-section of the raw material glass plate of FIG. 5 taken with the electron microscope.

In example 1 and comparative example 1, the second polishing process was performed using a soft polisher made of polyurethane and having the properties shown in table 1. The processing conditions for the second polishing process were five minutes of the pre-polishing under a load of 80 g/cm$^2$, five minutes of the rinsing process under a load of 60 g/cm$^2$, and five minutes of the post-polishing under a load of 60 g/cm$^2$. A soft polisher that had not undergone buff polishing in advance was used for example 1, and a soft polisher that had undergone buff polishing in advance was used for comparative example 1. The NRa of the surface was measured for the raw material glass plate after polishing. The result is shown in table 1. The state of the surface and the cross-section of the soft polisher of example 1 taken by an electron microscope (SEM) are shown in FIG. 3 and FIG. 4. The state of the surface and the cross-section of the polisher of comparative example 1 are shown in FIG. 5 and FIG. 6. The image magnification of the electron microscope related to the surface state shown in FIGS. 3 and 5 is 100 and the image magnification related to the cross-section shown in FIGS. 4 and 6 is 40.

TABLE 1

|  |  | Example 1 | Comparative Example 1 |
|---|---|---|---|
| Thickness | mm | 1.13 | 1.08 |
| Hardness | Asker-C | 74 | 78 |
| Compressibility | % | 2.1 | 1.5 |
| Compressive Elasticity Modulus | % | 71.9 | 86.7 |
| Hole Diameter | μm | 10-40 | 30-80 |

TABLE 1-continued

|  |  | Example 1 | Comparative Example 1 |
|---|---|---|---|
| Surface Roughness Rmax of Nap Layer | μm | 19 | 35 |
| NRa of Raw material glass plate After Polishing | nm | 0.13 | 0.16 |

As apparent from FIG. 4, the soft polisher of example 1 had a nap layer with a generally two-layer structure. Further, as apparent from FIG. 3, the nap formation holes were densely and generally equally dispersed across the entire surface, and the hole diameters were substantially uniform. In comparison, in the soft polisher of comparative example 1, large independent air bubbles were open in the surface of the nap layer with a generally one-layer structure, as apparent from FIG. 6. As apparent from FIG. 5, the nap formation holes were dispersed across the surface and the hole diameters were not uniform. The micro waviness height NRa of the raw material glass plate after polishing was 0.13 nm in example 1 and 0.16 nm in comparative example 1. From the above results, it was shown that the micro waviness height NRa was improved by using the soft polisher in which the nap layer had a generally two-layer structure.

Observation of Nap Formation Hole Diameters

In reference examples 1 to 4, the soft polisher of example 1 was used, the hole diameters of the nap formation holes was changed in each example, and the second polishing process was performed under the conditions shown in table 2. The residual value of the polishing agent after the rinsing process and the surface roughness Ra and the micro waviness height NRa of the raw material glass plate after polishing were measured for each reference example. The results are shown in table 2. The residual value of the polishing agent was calculated in the following way. That is, the concentration was first changed in various ways for the polishing agent used in pre-polishing, and a standard solution for each concentration was prepared. Next, for reference examples 1 to 4, the color of the drainage liquid during the rinsing process and the color of the standard liquid were compared, and the concentration of the polishing agent in the drainage liquid of reference examples 1 to 4 was obtained. Then, using reference example 1 as a criteria, the proportion of the concentration of the reference examples 2 to 4 with respect to the concentration of the reference example 1 was calculated as the residual value of the polishing agent.

From the results of table 2, the residual value of the polishing agent was less than or equal to 1 and thus small for reference examples 1 and 2 having hole diameters of between 5 and 10 μm, and satisfactory results were also obtained for the surface roughness Ra and the micro waviness height NRa. In comparison, for reference examples 3 and 4 respectively having an aperture diameter of between 30 and 90 μm, the residual values of the polishing agent were 10 and 4 and thus large. Further, the surface roughness Ra and the micro waviness height NRa were higher than reference examples 1 and 2.

From these results, when the hole diameter of the nap formation hole was increased, a large amount of polishing agent remained even when the rinsing process was performed. This shows that the quality of the manufactured glass substrate was affected.

Observation of Load

In reference examples 5 to 10, the second polishing process was performed using the soft polisher of example 1 while changing the load for the pre-polishing, the rinsing process, and the post-polishing as shown in table 3. The state of each raw material glass plate was visually observed. The results are shown in table 3.

TABLE 3

|  | Load (g/cm$^2$) | | | |
|---|---|---|---|---|
|  | Pre-Polishing | Rinsing Process | Post-Polishing | State |
| Reference Example 5 | 80 | 60 | 60 | Satisfactory |
| Reference Example 6 | 80 | 50 | 60 | Satisfactory |
| Reference Example 7 | 90 | 60 | 60 | Satisfactory |
| Reference Example 8 | 80 | 90 | 60 | Some Having Processing Cracks |
| Reference Example 9 | 80 | 80 | 60 | Some Having Scratches |
| Reference Example 10 | 80 | 20 | 60 | Some Having Processing Cracks |

From the results of table 3, in reference examples 5 to 7, in which load of the rinsing process was lower than that of the pre-polishing and the same or lower than the load of the post-polishing, a visually satisfactory glass substrate was obtained. In comparison, in reference example 8, in which the load of the rinsing process was higher than that of pre-polishing and post-polishing, processing cracks were formed in

TABLE 2

|  | Hole Diameter of Pad (μm) | Polishing Time (min) | | | Residual Value of Polishing agent | Quality of Raw material glass plate After Polishing (nm) | |
|---|---|---|---|---|---|---|---|
|  |  | Pre-Polishing | Rinsing Process | Post-Polishing |  | NRa | Ra |
| Reference Example 1 | 5-10 | 5 | 5 | 5 | 1 | 0.17 | 0.31 |
| Reference Example 2 | 5-10 | 5 | 10 | 10 | 0.3 | 0.16 | 0.30 |
| Reference Example 3 | 30-90 | 5 | 5 | 5 | 10 | 0.25 | 0.35 |
| Reference Example 4 | 30-90 | 5 | 10 | 10 | 4 | 0.22 | 0.37 | some of the manufactured raw material glass plates. In addition, in reference example 9, in which the load of the rinsing process was the same as that of pre-polishing, scratches were formed in some of the manufactured raw material glass plates. Such results showed that it is preferable that the load of the rinsing process be lower than the load of the pre-polishing and the same or lower than the load of the post-polishing. Further, when the load of the rinsing process is lower than that of the pre-polishing, processing cracks sometimes formed in reference example 10 in which the load was excessively low. This is thought to be because the glass substrate could not be sufficiently pressed by the polishing pad during polishing and thus could not be hold in the carrier. The load of the rinsing process is preferably between 25 and 70 g/cm$^2$, and more preferably between 50 and 60 g/cm$^2$.

The present embodiment may be modified and embodied as described below.

A chemical strengthening process may be performed on the raw material glass plate in a step before the polishing step, after the polishing step, or between each polishing step to satisfy impact resistance, vibration resistance, and heat resistance characteristics required for the information recording medium. The chemical strengthening process refers to ion conversion of a monovalent metal ion such as lithium ion and sodium ion contained in the composition of the glass substrate to a monovalent metal ion such as sodium ion and potassium ion having a greater ion radius. Further, it is a method for enabling chemical strengthening by applying compression stress on the surface of the glass substrate. The chemical strengthening method is performed by dipping the glass substrate over a predetermined time into a chemical strengthening process liquid in which the chemical strengthening salt obtained by heating and melting a chemical strengthening salt.

Examples of chemical strengthening salts include potassium nitrate, sodium nitrate, silver nitrate used independently or as a mixture of at least two of the above materials. The temperature of the chemical strengthening liquid is a temperature that is preferably lower than the distortion point of the material used in the glass substrate by about 50 to 150° C., and more preferably the temperature of the chemical strengthening process liquid itself is about 300 to 450° C. When the temperature is lower than the distortion point of the material of the glass substrate by about 150° C., the glass substrate cannot be sufficiently subjected to the chemical strengthening process. If the temperature exceeds a temperature that is lower than the distortion point of the material of the glass substrate by about 50° C., the glass substrate may be distorted when performing the chemical strengthening process on the glass substrate.

In the above embodiments, the polishing process is performed using the batch-type polishing device. However, the polishing device is not limited, and the polishing process may be performed using a sheet-type polishing device for polishing glass substrates one at a time.

The lapping step may be omitted as long as the surface conditions of the raw material glass plate, such as roughness, warp, wavinesss, and the like, satisfy the desired values after the beveling step. In such a case, the task time is further shortened.

The invention claimed is:

1. A method for manufacturing a glass substrate for an information recording medium manufactured by polishing the surface of a raw glass plate, the method comprising:
    performing a first polishing process to roughly polish the surface of the raw glass plate to form a roughly polished raw glass plate; and
    performing a second polishing process to finely polish the surface of the roughly polished raw glass plate;
    wherein the second polishing process includes two stages:
        pre-polishing with a soft polisher and a polishing agent including abrasive grains of cerium oxide; and,
        post-polishing with a polishing agent including abrasive grains of silicon oxide;
        wherein, a rinsing process is performed between the pre-polishing and the post-polishing comprising rinsing the raw glass plate with a washing liquid while sliding the raw glass plate on a surface of the soft polisher.

2. The method for manufacturing a glass substrate for the information recording medium according to claim 1, wherein the abrasive grains of cerium oxide have a mean grain diameter of 1.5 μm or less and are smaller than a nap formation hole for the soft polisher.

3. The method for manufacturing a glass substrate for the information recording medium according to claim 2, wherein the abrasive grains of silicon oxide have a grain diameter that is smaller than the grains of cerium oxide, a mean grain diameter ($D_{50}$) of less than or equal to 0.2 μm, and are smaller than an aperture diameter of a nap formation hole for the soft polisher.

4. The method for manufacturing a glass substrate for the information recording medium according to claim 2 wherein the second polishing process has a total task time of 7 to 45 minutes.

5. The method for manufacturing a glass substrate for the information recording medium according to claim 2, wherein the post-polishing has a task time of 1 to 40 minutes.

6. The method for manufacturing a glass substrate for the information recording medium according to claim 2 wherein the rinsing process has a task time of 1 to 20 minutes.

7. The method for manufacturing a glass substrate for the information recording medium according to claim 2, wherein in the rinsing process, a load applied to the raw glass plate by the soft polisher is lower than a load applied to the raw glass plate by the soft polisher in the pre-polishing stage.

8. The method for manufacturing a glass substrate for the information recording medium according to claim 2, wherein in the rinsing process, load applied to the raw glass plate by the soft polisher is the same as or lower than a load applied to the raw glass plate by the soft polisher in the post-polishing stage.

9. The method for manufacturing a glass substrate for the information recording medium according to claim 2, a load applied to the raw glass plate by the surface of the soft polisher during the rinsing process is 25 to 70 g/cm$^2$.

10. The method for manufacturing a glass substrate for the information recording medium according to claim 1, wherein the second polishing process has a total task time of 7 to 45 minutes.

11. The method for manufacturing a glass substrate for the information recording medium according to claim 1, wherein the post-polishing has a task time of 1 to 40 minutes.

12. The method for manufacturing a glass substrate for the information recording medium according to claim 1, wherein the rinsing process has a task time of 1 to 20 minutes.

13. The method for manufacturing a glass substrate for the information recording medium according to claim 1, wherein in the rinsing process a load applied to the raw glass plate by the surface of the soft polisher is lower than a load applied to the raw glass plate by the surface of the soft polisher in the pre-polishing stage.

14. The method for manufacturing a glass substrate for the information recording medium according to claim 1, wherein in the rinsing process, load applied to the raw glass plate by the surface of the soft polisher is the same as or lower than a load applied to the raw glass plate by the surface of the soft polisher in the post-polishing stage.

15. The method for manufacturing a glass substrate for the information recording medium according to claim 1, wherein a load applied to the raw glass plate by the surface of the soft polisher during the rinsing process is 25 to 70 g/cm².

16. The method for manufacturing a glass substrate for the information recording medium according to claim 1, wherein the abrasive grains of silicon oxide have a grain diameter that is smaller than the grains of cerium oxide, a mean grain diameter of less than or equal to 0.2 μm, and are smaller than an aperture diameter of a nap formation hole for the soft polisher.

* * * * *